US011402228B2

(12) United States Patent
Matsumoto et al.

(10) Patent No.: US 11,402,228 B2
(45) Date of Patent: Aug. 2, 2022

(54) VEHICLE CONTROL SYSTEM AND COMPUTING DEVICE

(71) Applicant: Hitachi, Ltd., Tokyo (JP)

(72) Inventors: Takashi Matsumoto, Tokyo (JP); Akihiro Kondo, Tokyo (JP); Akihiko Hyodo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 45 days.

(21) Appl. No.: 17/014,564

(22) Filed: Sep. 8, 2020

(65) Prior Publication Data

US 2021/0108940 A1   Apr. 15, 2021

(30) Foreign Application Priority Data

Oct. 11, 2019 (JP) .............................. JP2019-187612

(51) Int. Cl.
| | | |
|---|---|---|
| *G06F 3/048* | (2013.01) | |
| *G01C 21/34* | (2006.01) | |
| *G01C 21/36* | (2006.01) | |

(52) U.S. Cl.
CPC ..... *G01C 21/3492* (2013.01); *G01C 21/3667* (2013.01)

(58) Field of Classification Search
CPC .................. G01C 21/3492; G01C 21/3667
See application file for complete search history.

(56) References Cited

U.S. PATENT DOCUMENTS

| | | | | |
|---|---|---|---|---|
| 10,318,104 B2* | 6/2019 | Pylappan | ........... | G01C 21/3608 |
| 10,971,009 B2* | 4/2021 | Anantharam | ......... | G08G 1/123 |
| 11,055,912 B2* | 7/2021 | Moore | ................ | G09B 29/007 |
| 11,072,346 B2* | 7/2021 | Okada | ............... | B60W 50/0098 |
| 11,109,249 B2* | 8/2021 | Campbell, Jr. | ....... | H04L 41/147 |
| 11,137,766 B2* | 10/2021 | Gier | .................. | B60W 60/0011 |
| 11,215,474 B2* | 1/2022 | Hori | ................... | G01C 21/3697 |
| 11,268,819 B2* | 3/2022 | Inoue | ................. | G01C 21/3484 |
| 2011/0224898 A1* | 9/2011 | Scofield | ................. | G08G 1/052 |
| | | | | 701/532 |
| 2013/0345959 A1* | 12/2013 | van Os | ............ | G08G 1/096866 |
| | | | | 701/408 |
| 2020/0065842 A1* | 2/2020 | Viswanathan | ..... | G01C 21/3461 |
| 2020/0160707 A1* | 5/2020 | Yasui | ..................... | G08G 1/123 |
| 2020/0346662 A1 | 11/2020 | Suzuki et al. | | |

(Continued)

FOREIGN PATENT DOCUMENTS

| | | |
|---|---|---|
| CN | 109426930 A | 3/2019 |
| JP | 2019-83017 A | 5/2019 |
| WO | WO 2019/093190 A1 | 5/2019 |

OTHER PUBLICATIONS

Extended European Search Report issued in European Application No. 20195178.7 dated Mar. 2, 2021 (nine (9) pages).

(Continued)

*Primary Examiner* — David Phantana-angkool
(74) *Attorney, Agent, or Firm* — Crowell & Moring LLP

(57) ABSTRACT

A vehicle control system includes in-vehicle devices, a comparison unit, and an occupation management unit. The comparison unit calculates a section and time of a road occupied by a first vehicle and unavailable for another vehicle to travel based on the trajectory of the first vehicle generated by the trajectory generation unit. The occupation management unit adds the section and the time calculated by the comparison unit into the occupation information.

6 Claims, 11 Drawing Sheets

143

| LINK | SECTION | | OCCUPATION INFORMATION | | |
|---|---|---|---|---|---|
| | TRAVELING DIRECTION | TRANSLATION DIRECTION | STARTING TIME | ENDING TIME | PLAN NUMBER |
| L3 | 10 m FROM NORTH END | FIRST LANE | 11:35 | 11:40 | P1 |
| L12 | ENTIRE SECTION | ALL LANES | 12:05 | 12:08 | P1 |
| L40 | LATITUDE xx TO LATITUDE yy | THIRD AND FOURTH LANES | 13:40 | 13:50 | P3 |
| .. | .. | .. | .. | .. | .. |

14311  1431  14312  14313  1432  1433  1434

(56) References Cited

U.S. PATENT DOCUMENTS

2021/0356288 A1* 11/2021 Hajj .................. G01C 21/3826
2021/0370989 A1* 12/2021 Morimura ............... B60P 3/007
2021/0381847 A1* 12/2021 Cajias ................. G01C 21/387

OTHER PUBLICATIONS

Chinese-language Office Action issued in Chinese Application No. 202010861389.4 dated Mar. 31, 2022 with English translation (24 pages).

* cited by examiner

FIG. 3

| REQUEST NUMBER | DELIVERY ORIGIN | DELIVERY DESTINATION | TIME CONSTRAINT |
|---|---|---|---|
| | | VEHICLE ALLOCATION REQUEST | |
| R1 | BUILDING A | BUILDING B | COLLECTION UNTIL 12:00 |
| R2 | BUILDING C | BUILDING D | COLLECTION UNTIL 13:15 AND DELIVERY UNTIL 15:30 |
| R3 | BUILDING E | BUILDING F | .. |
| .. | .. | .. | .. |

FIG. 7

| LINK | SECTION | | OCCUPATION INFORMATION | | |
|---|---|---|---|---|---|
| | TRAVELING DIRECTION | TRANSLATION DIRECTION | STARTING TIME | ENDING TIME | PLAN NUMBER |
| L3 | 10 m FROM NORTH END | FIRST LANE | 11:35 | 11:40 | P1 |
| L12 | ENTIRE SECTION | ALL LANES | 12:05 | 12:08 | P1 |
| L40 | LATITUDE xx TO LATITUDE yy | THIRD AND FOURTH LANES | 13:40 | 13:50 | P3 |
| .. | .. | .. | .. | .. | .. |

VEHICLE CONTROL SYSTEM AND COMPUTING DEVICE

BACKGROUND OF THE INVENTION

1. Field of the Invention

The present invention relates to a vehicle control system and a computing device.

2. Description of the Related Art

The related art discloses a system that collectively manages a plurality of vehicles with a server or a center. In the system, the server sends an operation instruction to each vehicle, and the vehicle is operated in accordance with the instruction received from the server. JP-A-2019-83017 (Patent Literature 1) discloses an automatic traveling control system that includes an automatic traveling control device mounted on a vehicle and a center communicable with the automatic traveling control device. The automatic traveling control device includes a host vehicle position grasping unit that notifies the center of position information of a host vehicle on which the automatic traveling control device is mounted, an automatic traveling unit that controls a traveling direction and a speed of the host vehicle and performs automatic traveling in which the host vehicle travels along a traveling route notified by the center to a destination notified by the center, a notification unit that makes an occurrence notification to notify the center of a predetermined prohibited action and/or emergency operation when the prohibited action occurs in the host vehicle and/or when the emergency operation for reporting an occurrence of an emergency occurs in the host vehicle, and a stopping unit that stops the host vehicle when the prohibited action and/or the emergency operation occur. The center includes a setting unit that sets the traveling route and the destination for the vehicle based on map data and notifies the vehicle of the traveling route and the destination, and a control unit that drives another vehicle other than the vehicle based on a stopping position of the vehicle when the occurrence notification is received from the vehicle. The stopping position of the vehicle is grasped based on the position information of the vehicle.

The invention disclosed in Patent Literature 1 does not have sufficient measures for a case in which it is scheduled in advance that a part of a road is unavailable.

SUMMARY OF THE INVENTION

A vehicle control system according to a first aspect of the present invention includes in-vehicle devices each mounted on a corresponding one of a plurality of vehicles and a computing device. The in-vehicle device receives a vehicle allocation plan including time and travel route information from the computing device. The computing device includes a storage unit that stores a vehicle allocation request, map information, and occupation information. The vehicle allocation request includes constraints on a first place, a second place, and time. The map information includes information relating to connection of roads on which a vehicle travels. The occupation information includes a section and time of a road that is occupied and unavailable for traveling. The computing device includes a route generation unit that calculates a route from the first place to the second place together with time information by using the occupation information and the map information and creates the vehicle allocation plan, the route satisfying constraints on the time and not passing through a road that is unavailable for traveling and included in the occupation information, a trajectory generation unit that calculates a trajectory for a first vehicle on the route calculated by the route generation unit, a comparison unit that calculates a section and time of a road occupied by the first vehicle and unavailable for another vehicle to travel based on the trajectory of the first vehicle generated by the trajectory generation unit, and an occupation management unit that adds the section and the time calculated by the comparison unit into the occupation information.

A computing device according to a second aspect of the present invention is communicable with a plurality of in-vehicle devices that are each mounted on a corresponding one of vehicles and receive a vehicle allocation plan including time and travel route information. The computing device includes a storage unit that stores a vehicle allocation request, map information, and occupation information. The vehicle allocation request includes constraints on a first place, a second place, and time. The map information includes information relating to connection of roads on which a vehicle travels. The occupation information includes a section and time of a road that is occupied and unavailable for traveling. The computing device further includes a route generation unit that calculates a route from the first place to the second place together with time information by using the occupation information and the map information and creates the vehicle allocation plan, the route satisfying constraints on the time and not passing through a road that is unavailable for traveling and included in the occupation information, a trajectory generation unit that calculates a trajectory for a first vehicle on the route calculated by the route generation unit, a comparison unit that calculates a section and time of a road occupied by the first vehicle and unavailable for another vehicle to travel based on the trajectory of the first vehicle generated by the trajectory generation unit, an occupation management unit that adds the section and the time calculated by the comparison unit into the occupation information, and a server communication unit that transmits the vehicle allocation plan to the in-vehicle devices mounted on the vehicles.

According to the invention, when it is scheduled in advance that a part of a road is unavailable, a route using only an available road can be created in advance.

BRIEF DESCRIPTION OF THE DRAWINGS

FIG. 3 is a diagram showing an example of a vehicle allocation request.

FIG. 7 is a diagram showing an example of occupation information according to a fifth modification.

DESCRIPTION OF THE PREFERRED EMBODIMENTS

First Embodiment

Hereinafter, a vehicle control system according to a first embodiment will be described with reference to FIGS. 1 to 6.

(System Overview)

The vehicle control system manages vehicles in a specific area A. Examples of the area A includes a harbor, a public institution, a district, a city, a country, and one or plural continents. Each vehicle travels inside a vehicle traveling zone. Depending on a positional relationship between the vehicle traveling zone and a destination, the vehicle crosses through another vehicle traveling zone. When, for example, an objective is to load or unload cargoes, traveling of a vehicle may be inevitably slowed down since a rear side of the vehicle turns to approach a destination first, or plural times of turns may occur in order to change directions. The vehicle may occupy a road for several minutes and traveling of other vehicles may be hindered. By grasping such road occupation in advance, the vehicle control system calculates a route in which no road occupation by other vehicles occurs. The vehicle traveling zone is an area defined by white lines, traffic cones, or the like. The vehicle traveling zone is also referred to as a travel lane. The vehicle traveling zone is an area that is set on a premise that only one vehicle is present in a translation direction and is long and extends in a traveling direction.

(Hardware Configuration)

Figure 1:
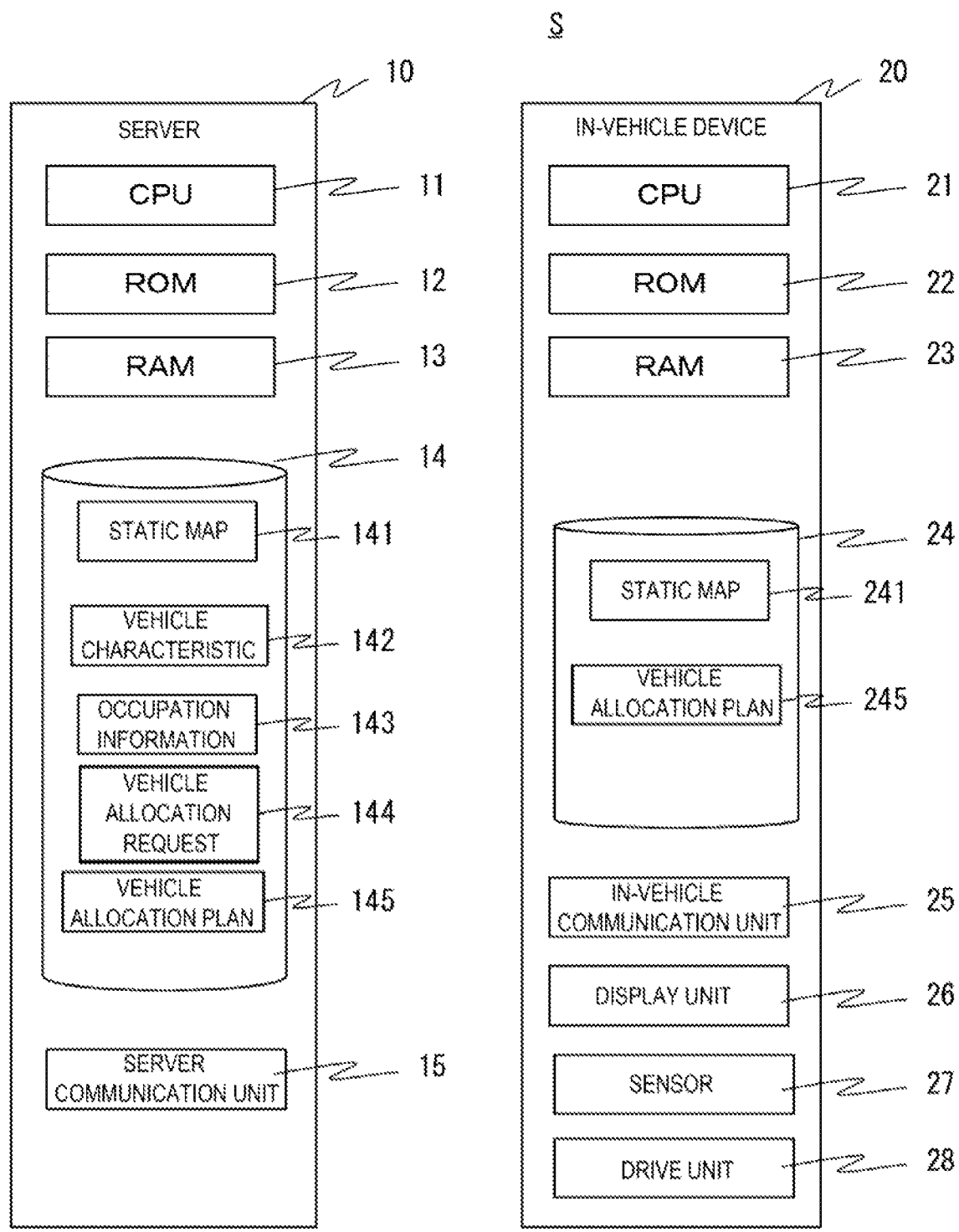
FIG. 1 is a hardware configuration diagram of a vehicle control system according to a first embodiment.

FIG. 1 is a hardware configuration diagram of a vehicle control system S. The vehicle control system S includes a server 10 and a plurality of in-vehicle devices 20 mounted on a plurality of vehicles. Only one in-vehicle device 20 is shown in FIG. 1, and each of the in-vehicle devices 20 is mounted on a respective one of the plurality of vehicles. The in-vehicle devices 20 may not necessarily have the same configuration. A configuration of the in-vehicle device 20 to be described later is common in all of the in-vehicle devices 20. Hereinafter, a vehicle on which the in-vehicle device 20 to be described later is mounted is also referred to as a "host vehicle".

The server 10 includes a central processing unit (CPU) 11, a ROM 12 which is a read-only storage device, a RAM 13 which is a readable and writable storage device, a server storage unit 14 which is a readable and writable storage device, and a server communication unit 15. The CPU 11 implements a plurality of functions to be described later by loading a program stored in the ROM 12 into the RAM 13 and executing the program. The server storage unit 14 is a hard disk drive or the like and stores a plurality of pieces of information to be described later.

The server communication unit 15 is a communication module that communicates with the in-vehicle device 20. A communication route between the server communication unit 15 and the in-vehicle device 20 is assumed to have various forms. For example, the server communication unit 15 may directly communicate with the in-vehicle device 20 wirelessly, or the server communication unit 15 may communicate with the in-vehicle device 20 via a plurality of communication networks. When the server communication unit 15 communicates with the in-vehicle device 20 via a plurality of communication networks, the Internet may be used or a mobile communication network may be used.

The in-vehicle device 20 includes a central processing unit (CPU) 21, a ROM 22 which is a read-only storage device, a RAM 23 which is a readable and writable storage device, an in-vehicle storage unit 24 which is a readable and writable storage device, an in-vehicle communication unit 25, a display unit 26, a sensor 27, and a drive unit 28. The CPU 21 implements a plurality of functions to be described later by loading a program stored in the ROM 22 into the RAM 23 and executing the program. The in-vehicle storage unit 24 is a flash memory or the like and stores a plurality of pieces of information to be described later. The in-vehicle communication unit 25 is a wireless communication module that communicates with the server 10.

The display unit 26 is, for example, a liquid crystal display. Information is presented on the display unit 26 by a function of the in-vehicle device 20 to be described later, and the information is presented to an occupant of the host vehicle. The sensor 27 is a general term for a sensor that collects information around the host vehicle. The sensor 27 may be one sensor, or may be formed of a plurality of sensors. The sensor 27 is a camera, a laser range scanner, or the like. The drive unit 28 is hardware that controls driving, braking, and steering of the host vehicle. The drive unit 28 is operated by a function to be described later, and achieves an autonomous movement of the host vehicle.

(Data)

The server storage unit 14 stores map information 141, a vehicle characteristic 142, occupation information 143, a vehicle allocation request 144, and a vehicle allocation plan 145. In the present embodiment, the map information 141, the vehicle characteristic 142, and the vehicle allocation request 144 are static information created in advance. The occupation information 143 and the vehicle allocation plan 145 are obtained by calculation which will be described later, and are rewritten by an arithmetic processing.

The map information 141 includes building information, node information, link information, and detailed information of each link. The building information includes, for each building, a name, a latitude and a longitude, an area of a parking lot, an entry direction from a road to the parking lot, and the like. The node information is an identification number of a node and a latitude and a longitude of the node. The node is a point set corresponding to an intersection, a branch, or the like on a road. The link information is an identification number of a link that is a line connecting two nodes arranged along a road, and identification numbers of the two nodes connected by the link. The detailed information of each link includes the number of travel lanes, a width of each travel lane, a traveling available direction, a speed limitation, and the like. The vehicle characteristic 142 includes a width, a length, a minimum rotation radius, a weight, a yaw moment of inertia, axle spacing, a position of a center of gravity, and the like of a vehicle.

The occupation information 143 includes information for specifying an area of an occupied road, an occupation starting time point, an occupation ending time point, and an event that a road is occupied. Since the occupation information 143 is information on a traveling unavailable road, the occupation information 143 can also be referred to as traveling prohibition information. The area of an occupied road may be specified by a predetermined distance, for example, in units of meters, or may be specified in units of links.

Figure 2:
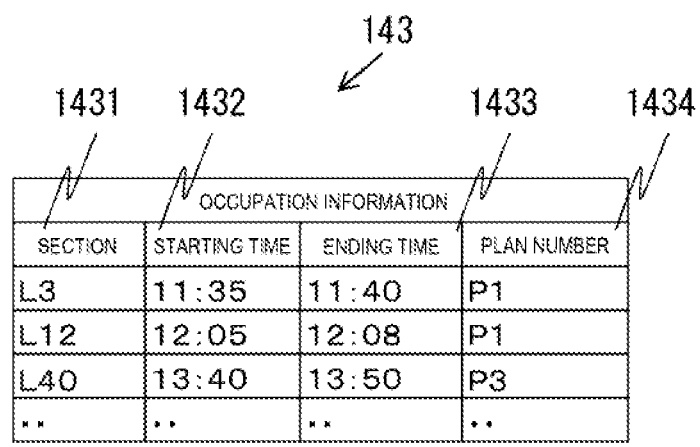
FIG. 2 is a diagram showing an example of occupation information.

FIG. 2 is a diagram showing an example of the occupation information 143. The occupation information 143 includes one or a plurality of records. Each record includes a field of a section 1431, a field of starting time 1432, a field of ending time 1433, and a field of a plan number 1434. A name of an occupied link is stored in the field of the section 1431. Road occupation starting time is stored in the field of the starting time 1432. Road occupation ending time is stored in the field of the ending time 1433. A plan number of a vehicle allocation plan that is a reason for road occupation is stored in the field of the plan number 1434.

In the example shown in FIG. 2, a plan can be seen in which two sections are occupied by the plan number "P1". One section is "L3" that is scheduled to be occupied from "11:35" to "11:40" and the other section is "L12" that is scheduled to be occupied from "12:05" to "12:08". The example shown in FIG. 2 further includes a plan in which a section "L40" is occupied by a plan number "P3" from "13:40" to "13:50".

The vehicle allocation request 144 includes information relating to a cargo delivery origin, a cargo delivery destination, and a time constraint. The cargo delivery origin and the cargo delivery destination are information capable of uniquely specifying a cargo delivery origin and a cargo delivery destination, such as a combination of a latitude and a longitude, a name of a destination, and a symbol indicating a destination. In the present embodiment, building names are used as the cargo delivery origin and the cargo delivery destination.

FIG. 3 is a diagram showing an example of the vehicle allocation request 144. The vehicle allocation request 144 includes one or a plurality of records. Each record includes a field of a request number 1441, a field of a delivery origin 1442, a field of a delivery destination 1443, and a field of a time constraint 1444. An identification symbol for identifying a vehicle allocation request is stored in the field of the request number 1441. A delivery origin of cargoes to be transported by a vehicle, that is, a name of a building where cargoes are to be collected by a vehicle, is stored in the field of the delivery origin 1442. Hereinafter, the delivery origin 1442 is also referred to as a "first place".

A name of a building serving as a destination where the collected cargoes are to be delivered is stored in the field of the delivery destination 1443. Time constraints on the delivery origin 1442 and the delivery destination 1443 are stored in the field of the time constraint 1444. Information stored in the field of the time constraint 1444 includes, for example, "collection until 12:00" and "collection until 13:15 and delivery until 15:30". Hereinafter, the delivery destination 1443 is also referred to as a "second place".

The example shown in FIG. 3 includes three requests "R1" to "R3". According to content of the request "R1", cargoes are collected at a "building A" until 12:00 and delivered to a "building B". According to the request "R1", there is limitation on arrival time to the delivery origin but no limitation on arrival time to the delivery destination. On the other hand, there is limitation on arrival time to both the delivery origin and the delivery destination according to the request "R2".

The vehicle allocation plan 145 stores information relating to a vehicle allocation created according to the vehicle allocation request 144. The vehicle allocation plan 145 stores information relating to a delivery origin which is a first destination of a vehicle, a delivery destination which is a second destination of the vehicle, a travel route from the delivery origin to the delivery destination, and time relating to traveling on a route.

Figure 4:
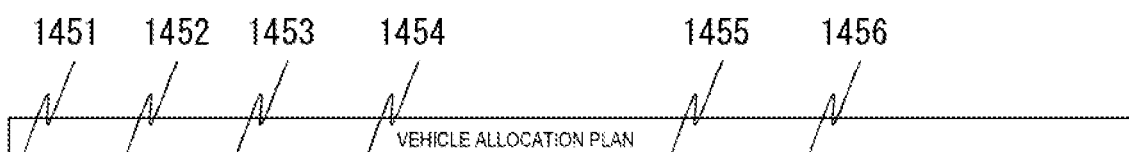
FIG. 4 is a diagram showing an example of a vehicle allocation plan.

FIG. 4 is a diagram showing an example of the vehicle allocation plan 145. The vehicle allocation plan 145 includes one or a plurality of records. Each record includes a field of a plan number 1451, a field of a request number 1452, a field of a delivery origin 1453, a field of a delivery destination 1454, a field of a route 1455, and a field of time 1456. An identification symbol for identifying a record of the vehicle allocation plan 145 is stored in the field of the plan number 1451. An identification symbol of a record of the vehicle allocation request 144 corresponding to the record of the vehicle allocation plan 145 is stored in the field of the request number 1452.

A delivery origin of cargoes to be transported by a vehicle, that is, a name of a building where cargoes are to be collected by a vehicle, is stored in the field of the delivery origin 1453. A name of a building serving as a destination where the collected cargoes are to be delivered is stored in the field of the delivery destination 1454. Information of a route from the delivery origin 1453 to the delivery destination 1454 is stored in the field of the route 1455. Information on time relating to a movement from the delivery origin 1453 to the delivery destination 1454 is stored in the field of the time 1456.

The example shown in FIG. 4 includes plans "P1" to "P3". The plans "P1" to "P3" respectively correspond to the requests "R1" to "R3" in order. The plan "P1" includes a route on which a vehicle sequentially passes through nodes "N1, N2 . . . ". The vehicle passes through the node N1 at "11:30" and passes through the node N2 at "11:33". Time points when the vehicle passes through all nodes are recorded in one record in FIG. 4. Alternatively, only time points when the vehicle passes through a part of the nodes may be recorded.

The in-vehicle storage unit 24 of the in-vehicle device 20 stores the map information 241 and the vehicle allocation plan 245. The map information 241 includes the same information as the map information 141 stored in the server storage unit 14. The map information 241 may be the same as the map information 141. Alternatively, the in-vehicle device 20 may download a part of the map information 141 from the server 10 as needed and the downloaded map information 141 may be used as the map information 241. The vehicle allocation plan 245 includes information including a part of the vehicle allocation plan 145. Specifically, the vehicle allocation plan 245 may be the vehicle allocation plan 145, or may be one record of the vehicle allocation plan 145.

(Functional Configuration)

Figure 5:
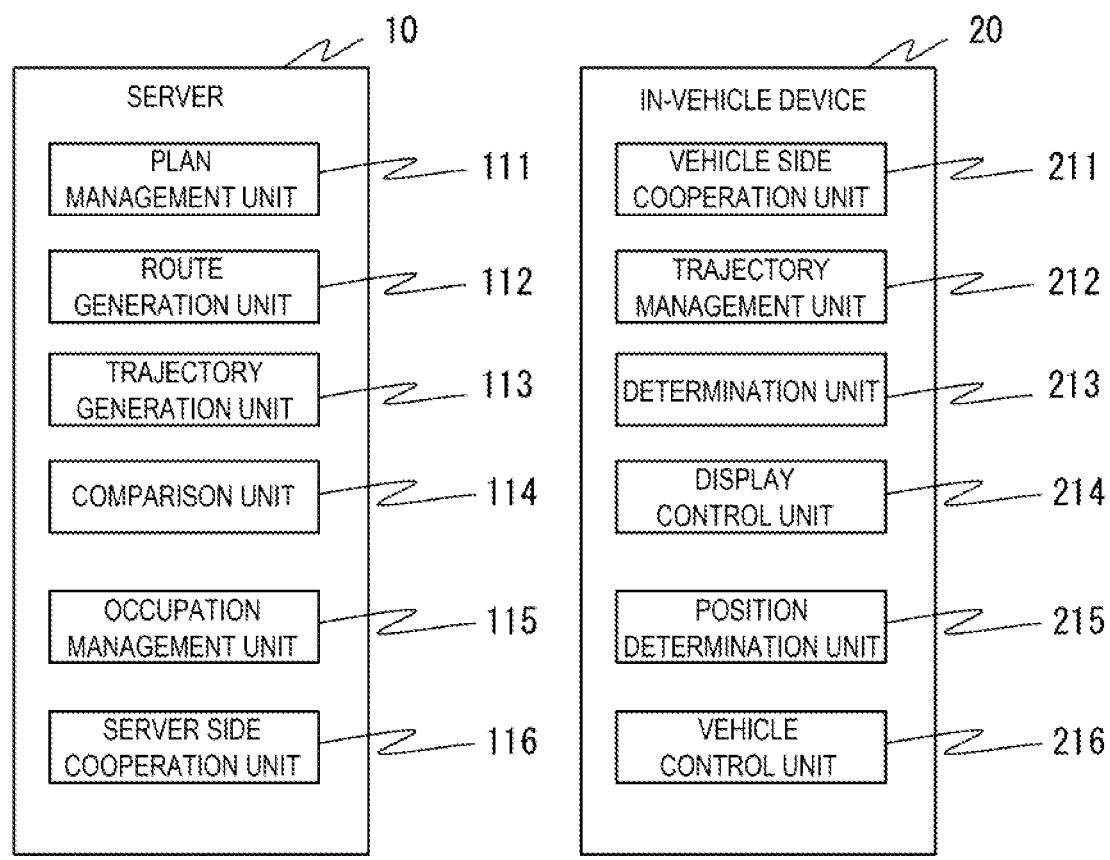
FIG. 5 is a functional configuration diagram of the vehicle control system.

FIG. 5 is a functional configuration diagram of the vehicle control system S. A functional configuration of the server 10 includes a plan management unit 111, a route generation unit 112, a trajectory generation unit 113, a comparison unit 114, an occupation management unit 115, and a server side cooperation unit 116.

The plan management unit 111 creates the vehicle allocation plan 145 using functional blocks to be described later based on the vehicle allocation request 144, and transmits the vehicle allocation plan 145 to each vehicle via the server side cooperation unit 116. Detailed operation of the plan management unit 111 will be described later.

The route generation unit 112 calculates a route for a vehicle to travel with reference to the vehicle allocation plan 145, the map information 141, and the occupation information 143. The route calculated by the route generation unit 112 is a route from the delivery origin 1451 to the delivery destination 1452. The route satisfies the time constraint 1453 and does not pass through a section that is unavailable for traveling according to the occupation information 143. In the route calculated by the route generation unit 112, for example, nodes through which a vehicle passes are arranged in order. The trajectory generation unit 113 calculates a route with finer granularity. The route generation unit 112 may use a link instead of a node, or may use a combination of a node and a link.

The route calculated by the route generation unit 112 and information relating to time are output to the vehicle allocation plan 145. The information relating to time includes, for example, arrival time to the delivery origin 1451 and arrival time to the delivery destination 1452. The information relating to time may be scheduled arrival time to each link on the route. When the route generation unit 112 cannot calculate a route satisfying a condition, the route generation unit 112 outputs a notice to the plan management unit 111 that a route cannot be calculated.

The trajectory generation unit 113 generates a trajectory on which a vehicle travels based on the route calculated by the route generation unit 112 in units finer than a link or a node, for example, in units of 0.1 meter. The trajectory generation unit 113 may not generate all trajectories on the route. Alternatively, the trajectory generation unit 113 generates at least a trajectory of places where a vehicle may deviate from a travel lane. For example, when a vehicle crosses another travel lane, the trajectory generation unit 113 generates a trajectory for entering or exiting from a parking lot of the delivery origin 1451 or the delivery destination 1452. Further, the trajectory generation unit 113 generates a trajectory at a curve or an intersection where a vehicle is likely to deviate from a travel lane based on a relationship among a width of the vehicle, a width of the travel lane, and a minimum rotation radius.

The comparison unit 114 calculates a section and time when the trajectory calculated by the trajectory generation unit 113 intersects with another travel lane. Specifically, when the trajectory overlaps another travel lane, the comparison unit 114 determines that the travel lane is occupied by a corresponding vehicle. The comparison unit 114 may determine the section where the trajectory overlaps another travel lane on a predetermined distance basis such as on one meter basis, or on a link basis. Since information relating to time when a vehicle travels on the trajectory calculated by the trajectory generation unit 113 is also included in the vehicle allocation plan 145, the comparison unit 114 calculates time when the travel trajectory of the vehicle crosses another travel lane with a fine granularity by referring to, for example, speed limitation information included in the map information 141. The fine granularity is in units of minute or second.

The occupation management unit 115 updates the occupation information 143 stored in the server storage unit 14 based on a calculation result of the comparison unit 114. The server side cooperation unit 116 communicates with the in-vehicle device 20 by using the server communication unit 15. The server side cooperation unit 116 transmits the vehicle allocation plan 145 to the in-vehicle device 20.

A functional configuration of the in-vehicle device 20 includes a vehicle side cooperation unit 211, a trajectory management unit 212, a determination unit 213, a display control unit 214, a position determination unit 215, and a vehicle control unit 216.

The vehicle side cooperation unit 211 is implemented by the CPU 21 and the in-vehicle communication unit 25. The vehicle side cooperation unit 211 communicates with the server 10, and receives information of the vehicle allocation plan 145 transmitted from the server 10. The vehicle side cooperation unit 211 can communicate with the server 10 using, for example, a mobile communication network (4G and 5G). The trajectory management unit 212 manages a travel trajectory at the time when the host vehicle moves autonomously based on the information of the vehicle allocation plan 145 transmitted from the server 10. Specifically, since a route included in the vehicle allocation plan 145 is described, for example, in units of nodes or links and an information amount is small, the trajectory management unit 212 acquires detailed information from the map information 241 to an extent that an autonomous movement can be implemented.

Based on the map information 241 and a current position of the host vehicle determined by the position determination unit 215, the determination unit 213 determines operation necessary for autonomously moving the host vehicle in accordance with a travel trajectory managed by the trajectory management unit 212. For example, a speed, acceleration, and a steering amount of the host vehicle are determined based on a length and curvature of the travel trajectory. At this time, the determination unit 213 may determine to reduce the speed, change the steering amount, and perform an emergency brake when, for example, an obstacle ahead of the host vehicle is detected by further using information around the host vehicle acquired from the sensor 27. Since the in-vehicle device 20 performs safe operation by using the information acquired from the sensor 27 in this manner, operation may not be performed in accordance with time stored in the vehicle allocation plan 245.

The display control unit 214 generates a screen to be displayed on the display unit 26 based on the map information 241, the travel trajectory managed by the trajectory management unit 212, and a determination result of the determination unit 213. Accordingly, the display unit 26 displays a screen showing a travel trajectory on a map, a screen notifying an occupant of the host vehicle that a travel trajectory is reset or an obstacle is detected, and the like. The occupant may be notified by a voice output from a speaker (not shown) together with the screen of the display unit 26, or may be notified by the voice instead of the screen of the display unit 26.

The position determination unit 215 determines a position of the host vehicle based on a GPS signal received by a GPS sensor (not shown) or information relating to a movement state of the host vehicle (such as a speed, acceleration, and a steering amount) detected by the sensor 27. The position of the host vehicle may be determined to be on road by performing a known map matching processing using the map information 241. Position information of the host vehicle determined by the position determination unit 215 is used to autonomously move the host vehicle in accordance with a route stored in the vehicle allocation plan 245.

The vehicle control unit 216 controls the host vehicle based on a result of determining operation of the host vehicle by the determination unit 213. The vehicle control unit 216 is connected with the drive unit 28 of the host vehicle, and controls the drive unit 28 to perform an acceleration operation, a brake operation, a wheel steering operation, and the like on the host vehicle, thereby controlling a movement state of the host vehicle in accordance with a determination result of the determination unit 213.

(Flowchart of Plan Management Unit 111)

Figure 6:
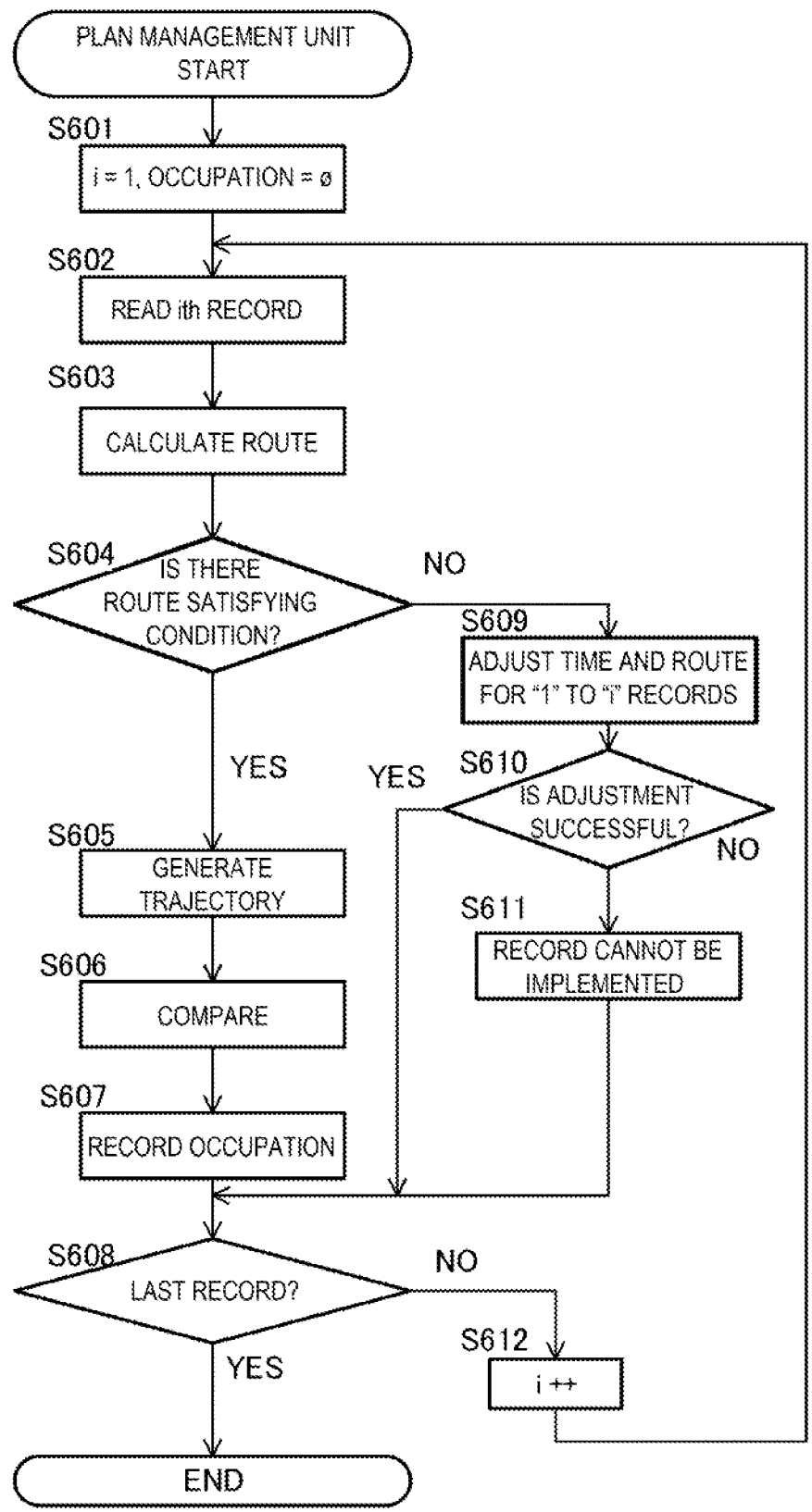
FIG. 6 is a flowchart showing a processing of a plan management unit.

FIG. 6 is a flowchart showing a processing of the plan management unit 111 in the server 10. An execution subject in each step to be described below is the CPU 11 of the server 10. For example, when the vehicle allocation request 144 is input from the outside, the server 10 causes the plan management unit 111 to execute the following processing.

In step S601, the plan management unit 111 initializes a variable i that is used as a loop counter to 1, and initializes the occupation information 143 to an empty set. Alternatively, when an instruction is input from the outside in advance, the plan management unit 111 may reflect the instruction in the occupation information 143. Next in step S602, the plan management unit 111 reads an "i"-th record of the vehicle allocation plan 145. Specifically, when i is "1", the plan management unit 111 reads a first record of the vehicle allocation plan 145.

Next in step S603, the plan management unit 111 causes the route generation unit 112 to calculate a route based on information read in step S602. Specifically, in the read record, the route generation unit 112 calculates a route from the delivery origin 1451 to the delivery destination 1452 that satisfies the time constraint 1453 and does not pass through a section unavailable for traveling according to the occupation information 143.

Next in step S604, the plan management unit 111 determines whether the route is calculated in step S603. When the plan management unit 111 determines that an output of the route generation unit 112 in step S603 is other than cannot be calculated, the processing proceeds to step S605. When the plan management unit 111 determines that the output of the route generation unit 112 is cannot be calculated, the processing proceeds to step S609. In step S605, the plan management unit 111 causes the trajectory generation unit 113 to generate a trajectory on the route calculated by the route generation unit 112 in step S603.

Next in step S606, the plan management unit 111 causes the comparison unit 114 to compare the trajectory calculated in step S605 and the map information 141. When the trajectory extends out of a travel route, the comparison unit 114 determines that a corresponding section is occupied. The comparison unit 114 also calculates time when the section is occupied with reference to time associated with the route calculated in step S603.

Next in step S607, the plan management unit 111 causes the occupancy management unit 115 to record a calculation result in step S606 in the occupation information 143. Next in step S608, the plan management unit 111 determines whether the "i"-th record is a last record of the vehicle allocation request 144. When the plan management unit 111 determines that the "i"-th record is the last record of the vehicle allocation request 144, the processing is ended as shown in FIG. 6. When the plan management unit 111 determines that the "i"-th record is not the last record of the vehicle allocation request 144, the processing proceeds to step S612.

The step S609 is executed when it is determined that the output of the route generation unit 112 in step S604 cannot be calculated. In step S609, the plan management unit 111 adjusts time and routes for the first to the "i"-th records of the vehicle allocation plan 145. Various known methods can be used in the adjustment. An example of the methods is as follows. First, the plan management unit 111 specifies, as changeable records, a record in which a plurality of routes can be selected and all records in which departure time can be changed. Next, the plan management unit 111 deletes, from the occupation information 143, information relating to road occupation in the changeable records. Then, the plan management unit 111 calculates a route for the "i"-th record, executes the processings in S605 to S607, and thereafter calculates routes for the changeable records again.

Next in step S610, the plan management unit 111 determines whether the adjustment in step S609 is successful. When the plan management unit 111 determines that the adjustment in step S609 is successful, the processing proceeds to step S608. When the plan management unit 111 determines that the adjustment in step S609 is not successful, the processing proceeds to step S611. In step S611, the plan management unit 111 records that the "i"-th record cannot be implemented. The processing proceeds to step S608.

The step 612 is executed when the plan management unit 111 determines that the "i"-th record is not the last record of the vehicle allocation request 144 in step S608. In step S612, when the plan management unit 111 increases the variable i by an increment of "1", the processing returns to step S602.

According to the first embodiment described above, the following effects are obtained.

(1) The vehicle control system S includes the in-vehicle device 20 mounted on a plurality of vehicles and a computing device that is the server 10. The in-vehicle device 20 receives the vehicle allocation plan 145 including time and travel route information from the server 10. The server 10 includes the server storage unit 14 that stores the vehicle allocation request 144, the map information 141, and the occupation information 143. The vehicle allocation request 144 includes the delivery origin 1442, the delivery destination 1443, and the time constraint 1444. The map information 141 includes information relating to connection of roads on which a vehicle travels. The occupation information 143 includes a section and time of a road that is occupied and unavailable for traveling. The server 10 includes the route generation unit 112 that calculates a route from the delivery origin 1442 to the delivery destination 1443 together with time information by using the occupation information 143 and the map information 141 and creates the vehicle allocation plan 145. The route satisfies the time constraint 1444 and does not pass through a road unavailable for traveling included in the occupation information 143. The server 10 further includes the trajectory generation unit 113 that calculates a vehicle trajectory on the route calculated by the route generation unit 112, the comparison unit 114 that calculates a section and time of a road occupied by a vehicle and unavailable for another vehicle to travel based on the vehicle trajectory generated by the trajectory generation unit 113, and the occupation management unit 115 that adds the section and the time calculated by the comparison unit 114 into the occupation information 143. Therefore, when it is scheduled in advance that a part of a road is unavailable, a route using only an available road can be created in advance. When another road needs to be occupied due to the creation of the route, routes for a plurality of vehicles can be created without contradiction since the occupation information 143 is updated.

(2) The in-vehicle device 20 controls the host vehicle on which the in-vehicle device 20 is mounted based on the vehicle allocation plan 245 received from the server 10. Therefore, the vehicle on which the in-vehicle device 20 is mounted can move autonomously.

First Modification

In the first embodiment described above, the vehicle on which the in-vehicle device 20 is mounted moves autonomously based on the vehicle allocation plan 245. Alternatively, the vehicle on which the in-vehicle device 20 is mounted may be driven by an occupant of the host vehicle. In this case, the in-vehicle device 20 outputs the vehicle allocation plan 245 to the host vehicle using the display control unit 214. Then, the occupant of the host vehicle controls the host vehicle in accordance with the vehicle allocation plan 245. That is, the first embodiment only requires a vehicle to operate within the route and time stored in the vehicle allocation plan 245 which is information received from the server 10, and a person may participate in control of the vehicle.

Second Modification

In the first embodiment described above, the vehicle allocation request 144 includes the delivery origin 1442 and the delivery destination 1443 on a premise that cargoes are moved from one place to another place. Alternatively, the vehicle allocation request 144 may store a destination or a passing through place for a vehicle. In addition, the time constraint 1444 may not be provided in at least a part of records. The destination of the vehicle or the passing through place of the vehicle may be information capable of uniquely specifying a destination or a passing through place, and may use a name of a place, a symbol indicating a place, a combination of a latitude and a longitude, and the like.

Third Modification

In the first embodiment described above, each of the server 10 and the in-vehicle device 20 is described as a hardware device. Alternatively, each of the server 10 and the in-vehicle device 20 may be formed of a plurality of pieces of hardware. That is, functions of the server 10 and the in-vehicle device 20 may be implemented by operating a plurality of pieces of hardware in cooperation with each other. In this case, the plurality of pieces of hardware may not be provided in the same place, and hardware provided at physically separated places may be connected via a network.

Fourth Modification

In the first embodiment described above, the route generation unit 112 generates a route in which a road is not occupied by another vehicle. Alternatively, the route generation unit 112 may generate a route in which a road is occupied when there is no other choice. However, in this case, it is desirable to generate a route in which waiting time of the host vehicle caused by another vehicle occupying a road is minimized.

Fifth Modification

In the first embodiment described above, a link is a specific example of a section. Alternatively, the section may be specified by a range smaller than a link, that is, at higher resolution. For example, the resolution in a traveling direction of a vehicle on a link may be improved, and may be further specified by a distance from an end of the link, a range of a latitude and a longitude, or the like. Alternatively, the resolution in a translation direction of a vehicle on a link may be improved, and a travel lane, that is, a vehicle traveling zone may be specified. In addition, the resolution may not be classified in the traveling direction and the translation direction only, and an occupied range may be specified using a latitude and a longitude. Examples of the specified and occupied range include "a circular area with latitude A1, longitude B1 serving as a center and having a radius of C1 meters" and "a rectangular area with latitude D1, longitude D2 serving as one vertex and latitude E1, longitude E2 serving as a diagonal vertex".

In the present modification, the plan management unit 111 and the occupation management unit 115 specify an occupied area with higher resolution than a link and record the occupied area in the occupation information 143. In the present modification, the route generation unit 112 calculates a route with reference to the occupation information 143 in the same manner as the first embodiment. However, since an area that is stored in the occupation information 143 and is unavailable for traveling has higher resolution than a link in the present modification, a vehicle may travel, for example, even on a link stored in the occupation information 143 at time stored in the occupation information 143.

FIG. 7 is a diagram showing the occupation information 143 according to the present modification. In an example shown in FIG. 7, the section 1431 includes a field of a link 14311, a field of a traveling direction 14312, and a field of a translation direction 14313. The field of the link 14311 stores a name of a link including an occupied area. The field of the traveling direction 14312 stores information for specifying a traveling direction of a vehicle in the occupied area. The field of the translation direction 14313 stores information for specifying a translation direction of a vehicle in the occupied area.

A first record in the example shown in FIG. 7 shows that a first lane at 10 m from a north end of a link L3 is occupied from "11:35" to "11:40". A second record shows that the entire link L12 is scheduled to be occupied from "12:05" to "12:08". A third record shows that a third lane and a fourth lane at latitude xx to latitude yy on a link L40 are occupied from "13:40" to "13:50".

The route generation unit 112 can generate, for example, the following routes with reference to the occupation information 143 shown in FIG. 7. For example, the route generation unit 112 can generate a route in which a vehicle travels on, for example, a second lane or the like of the link L3 other than the first lane of the link L3 during a period of time from "11:35" to "11:40". At a period of time from "13:40" to "13:50", the route generation unit 112 can also generate a route in which a vehicle travels on the link 40 in an area other than "the latitude xx to the latitude yy" or travels on a lane other than the third lane and the fourth lane.

According to the present modification, the following effect is achieved.

(3) The section has a granularity equal to or finer than a vehicle traveling zone. For example, as in the example shown in FIG. 7, the occupation information 143 can be expressed by a granularity of a travel lane, that is, a vehicle traveling zone, or can be expressed by a granularity finer than a travel lane by using a latitude and a longitude. According to the present modification, a road can be used more efficiently since the occupation information 143 is managed at a fine granularity.

Second Embodiment

A vehicle control system according to a second embodiment will be described with reference to FIGS. 8 and 9. In the following description, the same components as those in the first embodiment are denoted by the same reference numerals, and differences will be mainly described. Points that are not specifically described are the same as those in the first embodiment. The second embodiment is mainly different from the first embodiment in that a vehicle allocation plan is reviewed based on operation information of a vehicle. A hardware configuration of a vehicle control system S2 in the second embodiment is the same as that in the first embodiment.

(Functional Configuration)

Figure 8:
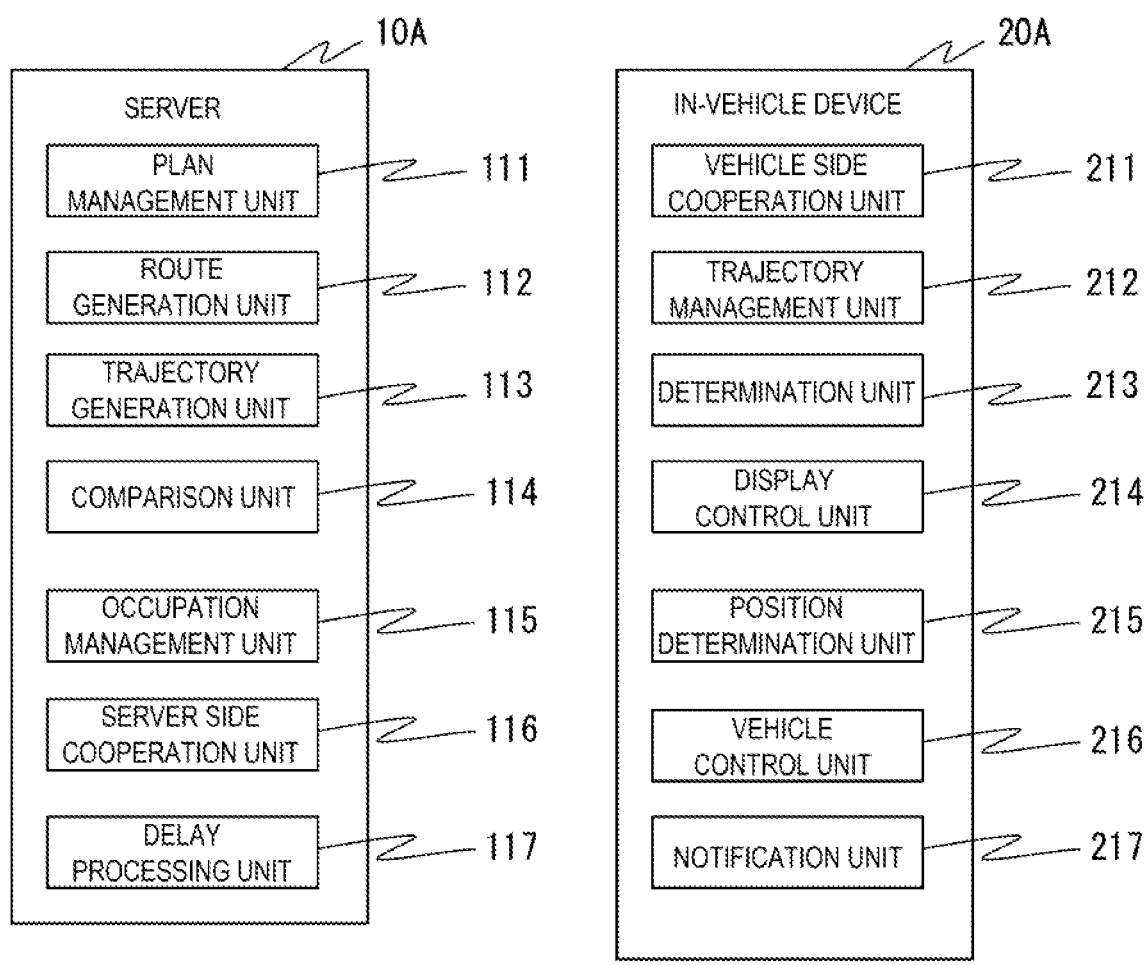
FIG. 8 is a functional configuration diagram of a vehicle control system according to a second embodiment.

FIG. 8 is a functional configuration diagram of the vehicle control system S2 and corresponds to FIG. 5 in the first embodiment. In the present embodiment, a server 10A further includes a delay processing unit 117, and an in-vehicle device 20A further includes a notification unit 217 that notifies the server 10A of position information of a host vehicle.

The notification unit 217 uses the in-vehicle communication unit 25 to notify the server 10A of position information of the host vehicle determined by the position determination unit 215 each time the host vehicle moves for a predetermined time interval or a predetermined distance. Hereinafter, the in-vehicle device 20A that notifies the server 10A of the position information is referred to as a "notification vehicle" for convenience. The notification may include time information. The server 10A may associate reception time of the notification with the position information of the notification vehicle on a premise that the notification is transmitted and received instantaneously. Alternatively, the notification unit 217 may notify the server 10A when the host vehicle arrives at a delivery origin and a delivery destination. Hereinafter, at least one of the position information of the host vehicle, arrival time to the delivery origin, and arrival time to the delivery destination is referred to as "notification vehicle route traveling information". In this manner, the notification unit 217 transmits the notification vehicle route traveling information to the server 10A.

Each time when a notification is received from the in-vehicle device 20A, the delay processing unit 117 of the server 10A refers to the vehicle allocation plan 145 and checks whether an operation status of the notification vehicle is delayed as compared with time stored in the vehicle allocation plan 145, that is, an operation schedule. When the server 10A determines that the operation of the notification vehicle is delayed, the server 10A recalculates an allocation plan for an influenced vehicle.

(Flowchart of Delay Processing Unit 117)

Figure 9:
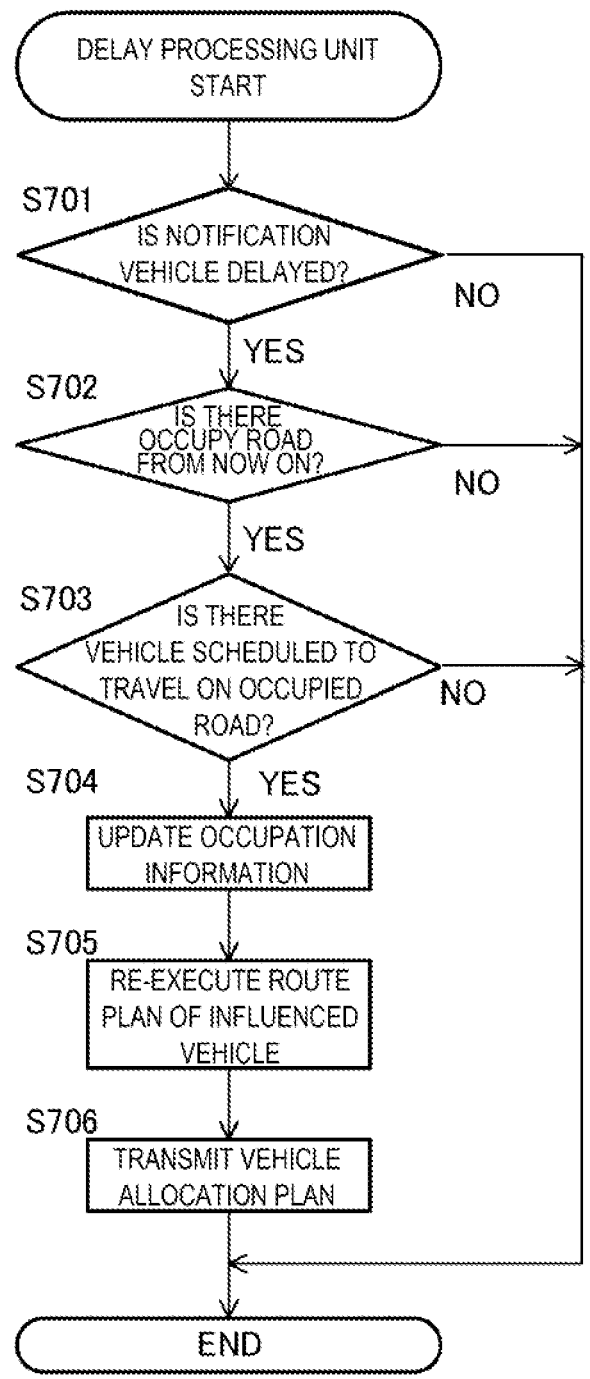
FIG. 9 is a flowchart showing a processing of a delay processing unit according to the second embodiment.

FIG. 9 is a flowchart showing a processing of the delay processing unit 117. An execution subject in each step to be described below is a CPU of the server 10A. Each time a notification is received from the in-vehicle device 20A, the delay processing unit 117 executes the processing shown in FIG. 9.

First in step S701, the delay processing unit 117 determines whether operation of the notification vehicle is delayed as compared with a plan with reference to a received notification. When the delay processing unit 117 determines that the operation of the notification vehicle is delayed as compared with the plan, the processing proceeds to step S702. When the delay processing unit 117 determines that the operation of the notification vehicle is not delayed, the processing shown in FIG. 9 is ended. In step S702, the delay processing unit 117 refers to the occupation information 143 and the vehicle allocation plan 145, and determines whether the notification vehicle is scheduled to occupy a road from now on. When the delay processing unit 117 determines that the notification vehicle is scheduled to occupy the road, the processing proceeds to step S703. When the delay processing unit 117 determines that the notification vehicle is not scheduled to occupy the road, the processing shown in FIG. 9 is ended.

Whether the notification vehicle is scheduled to occupy a road is implemented by, for example, the following procedures. First, the plan number 1451 of the notification vehicle in the vehicle allocation plan 145 is specified, and a record in the occupation information 143 whose plan number 1434 is the same as the plan number 1451 is specified. Next, the route 1455 of the vehicle allocation plan 145 and a current position of the notification vehicle are compared to specify a route on which the notification vehicle travels from now on. Then, it is determined whether the section 1431 in the specified record of the occupation information 143 is included in the specified route.

In step S703, the delay processing unit 117 determines whether there is a vehicle scheduled to pass through the occupied road determined in step S702 from now on with reference to the vehicle allocation plan 145. When the delay processing unit 117 determines that there is a vehicle scheduled to pass through the occupied road, the processing proceeds to step S704. When the delay processing unit 117 determines that there is no vehicle scheduled to pass through the occupied road, the processing shown in FIG. 9 is ended. In step S704, the delay processing unit 117 rewrites a record of the notification vehicle in the occupation information 143 according to the delay. For example, when the operation of the notification vehicle is delayed by 10 minutes as compared with a schedule, time of the record of the notification vehicle in the occupation information 143 is delayed by 10 minutes.

Next in step S705, the delay processing unit 117 re-executes a route plan of the vehicle that is determined to be scheduled to travel on the occupied road in step S703. In this case, the route generation unit 112 performs calculation with reference to the occupation information 143 updated in step S704. Next in step S706, the delay processing unit 117 transmits the vehicle allocation plan 145 obtained in step S705 to the in-vehicle device 20A via the server side cooperation unit 116, and the processing shown in FIG. 9 is ended.

According to the second embodiment described above, the following effects are obtained.

(4) The in-vehicle device 20A includes the notification unit 217 that notifies the server 10A of route traveling information. The server 10A includes the delay processing unit 117. The notification vehicle is a vehicle on which the in-vehicle device 20A that notifies the server 10A of the route traveling information is mounted. When the delay processing unit 117 determines that traveling of the notification vehicle is delayed as compared with a vehicle allocation plan (step S701 in FIG. 9: Yes), the delay processing unit 117 updates the occupation information based on the delay of the notification vehicle (S704) and causes the route generation unit 112 to recreate a vehicle allocation plan (S705). Therefore, the occupation information 143 can be updated in accordance with operation delay of each vehicle on which the in-vehicle device 20A is mounted, and the vehicle allocation plan 145 can be modified.

(5) The route traveling information includes at least one of position information of the notification vehicle, time when the notification vehicle arrives at a first place, and time when the notification vehicle arrives at a second place.

First Modification of Second Embodiment

The in-vehicle device 20A may transmit position information to the server 10A in response to at least one of arrival to a node, passing a node, arrival to a delivery origin, departure from a delivery origin, arrival to a delivery destination, and departure from a delivery destination.

Second Modification of Second Embodiment

When a notification is received from the in-vehicle device 20A, the delay processing unit 117 may determine whether operation of a vehicle is earlier than the schedule. When the operation of the vehicle is earlier than the schedule, the delay processing unit 117 may update occupation information and then re-generate a route for another vehicle. In this case, the delay processing unit 117 may not determine whether there is a vehicle scheduled to travel on a road occupied by the notification vehicle.

Figure 10:
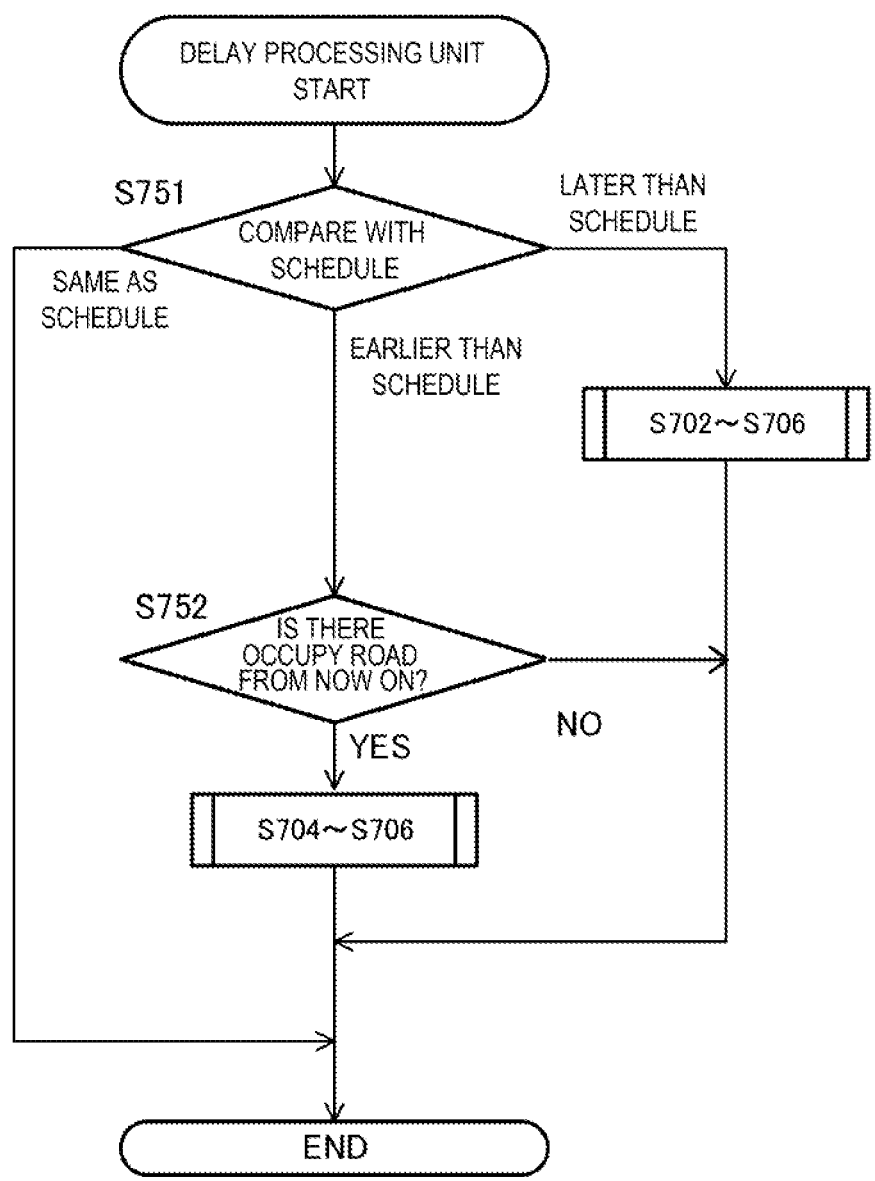
FIG. 10 is a flowchart showing a processing of a delay processing unit according to a second modification of the second embodiment.

FIG. 10 is a flowchart showing operation of the delay processing unit 117 according to the second modification of the second embodiment. That is, in the present modification, the delay processing unit 117 performs operation in the flowchart shown in FIG. 10 instead of the flowchart shown in FIG. 9. Each time a notification is received from the in-vehicle device 20A, the delay processing unit 117 executes a processing shown in FIG. 10.

First in step S751, the delay processing unit 117 determines whether operation of the notification vehicle is the same as the schedule, earlier than the schedule, or later than the schedule by using the received notification. When the delay processing unit 117 determines that the operation of the notification vehicle is the same as the schedule, the processing shown in FIG. 10 is ended. When the delay processing unit 117 determines that the operation of the notification vehicle is earlier than the schedule, the processing proceeds to step S752. When the delay processing unit 117 determines that the operation of the notification vehicle is later than the schedule, processings in steps S702 to S706 are executed. That is, when the delay processing unit 117 determines that the operation of the notification vehicle is later than the schedule, the delay processing unit 117 executes the same processings as those in the second embodiment.

In step S752, similarly to step S702 in FIG. 9, the delay processing unit 117 determines whether the notification vehicle is scheduled to occupy a road from now on with reference to the occupation information 143 and the vehicle allocation plan 145. When the delay processing unit 117 determines that the notification vehicle is scheduled to occupy a road, processing in steps S704 to S706 are executed. When the delay processing unit 117 determines that the notification vehicle is not scheduled to occupy a road, the processing shown in FIG. 10 is ended. According to the present modification, a road can be efficiently used when operation of a vehicle is earlier than a schedule.

Third Modification of Second Embodiment

The server 10A may further include a change processing unit corresponding to a dynamic environmental change in the area A. In the present modification, the server 10 acquires environmental information from a sensor installed in advance on a vehicle on which the in-vehicle device 20 is mounted, on a road side, or on a road. The environmental information is information relating to an obstacle that may hinder traveling of the vehicle. An example of the environmental information includes a temporary road closure due to an accident or on-road parking of another vehicle on which no in-vehicle device 20 is mounted. When the change processing unit detects a change in the environment information, the change processing unit determines whether there is a route in the vehicle allocation plan 145 on which traveling is hindered due to the change and re-calculates the route if necessary. For example, when a vehicle cannot travel because another vehicle is parked, another route is calculated for the vehicle to travel.

Figure 11:
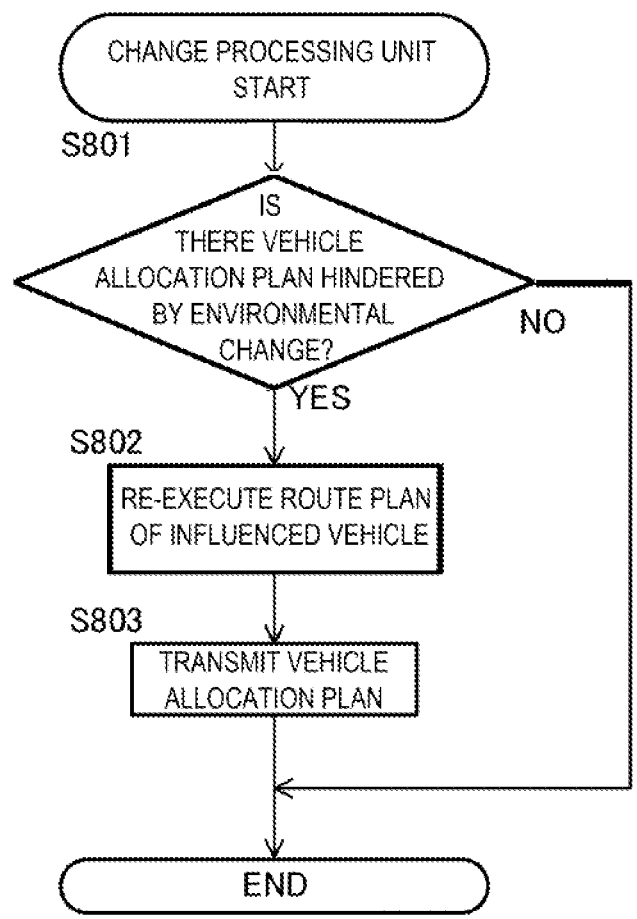
FIG. 11 is a flowchart showing operation of a change processing unit according to a third modification of the second embodiment.

FIG. 11 is a flowchart showing operation of the change processing unit according to the third modification of the second embodiment. When the change processing unit detects a change in the environment information, a processing shown in FIG. 11 is started. First in step S801, the change processing unit determines whether there is a route in the vehicle allocation plan 145 on which traveling is hindered due to the change in the environment information. When the change processing unit determines that there is a hindered route, the processing proceeds to step S802. When the change processing unit determines that there is no hindered route, the processing shown in FIG. 11 is ended.

In step S802, the change processing unit further provides the environment information to the route generation unit 112 to calculate a route. More specifically, in step S802, the route generation unit 112 calculates a route from the delivery origin 1451 to the delivery destination 1452 that satisfies the time constraint 1453 and does not pass through a section unavailable for traveling according to the occupation information 143 and the environment information. Next in step S803, the change processing unit transmits the vehicle allocation plan calculated in step S802 to the in-vehicle device 20A, and the processing shown in FIG. 11 is ended.

Fourth Modification of Second Embodiment

In the second embodiment described above, the "notification vehicle route traveling information" includes at least one of position information of the host vehicle, arrival time to a delivery origin, and arrival time to a delivery destination. Alternatively, the "notification vehicle route traveling information" may include arrival time to a node or a link, and time passing a node or a link. That is, the "notification vehicle route traveling information" may include at least one of position information of the host vehicle, arrival time to a delivery origin, arrival time to a delivery destination, arrival time to a node or a link, and time passing a node or a link. According to the present modification, a vehicle allocation plan can be modified in accordance with a change in environmental information.

Functional block configurations in the embodiments and modifications described above are merely examples. Some functional configurations shown as separate functional blocks may be integrated, or a configuration represented by one functional block diagram may be divided into two or more functions. A part of functions of each functional block may be provided in another functional block.

In the embodiments and modifications described above, a program of the server 10 is stored in a ROM (not shown). Alternatively, the program may be stored in the server storage unit 14. The server 10 includes an input and output interface (not shown). The program may be read from another device via the input and output interface and a medium available to the server 10 as needed. Here, the medium refers to a storage medium that is detachable from the input and output interface, a communication medium that is a network such as a wired network, a wireless network, and an optical network, carrier waves or a digital signal propagated through the network, and the like. A part or all of functions implemented by the program may be implemented by a hardware circuit or an FPGA.

The embodiments and modifications described above may be combined with each other. Although various embodiments and modifications have been described above, the invention is not limited thereto. Other embodiments that are considered within the scope of the technical idea of the invention are also included within the scope of the invention.

What is claimed is:
1. A vehicle control system comprising:
in-vehicle devices each mounted on a corresponding one of a plurality of vehicles; and
a computing device, wherein
the in-vehicle device receives a vehicle allocation plan including time and travel route information from the computing device,
the computing device includes
a storage unit that stores a vehicle allocation request, map information, and occupation information, the vehicle allocation request includes constraints on a first place, a second place, and time, the map information includes information relating to connection of roads on which a vehicle travels, the occupation information includes a section and time of a road that is occupied and unavailable for traveling, and the computing device further includes a route generation unit that calculates a route from the first place to the second place together with time information by using the occupation information and the map information and creates the vehicle allocation plan, the route satisfying constraints on the time and not passing through a road that is unavailable for traveling and included in the occupation information, a trajectory generation unit that calculates a trajectory for a first vehicle on the route calculated by the route generation unit, a comparison unit that calculates a section and time of a road occupied by the first vehicle and unavailable for another vehicle to travel based on the trajectory of the first vehicle generated by the trajectory generation unit, and an occupation management unit that adds the section and the time calculated by the comparison unit into the occupation information, and the in-vehicle devices further include a notification unit that notifies the computing device of information relating to traveling on the route, and the computing device further includes a delay processing unit that, when determining that traveling of a notification vehicle is delayed as compared with the vehicle allocation plan, updates the occupation information based on the delay of the notification vehicle and causes the route generation unit to recreate the vehicle allocation plan, the notification vehicle being a vehicle on which the in-vehicle device that notifies the computing device of the information relating to traveling on the route is mounted.

2. The vehicle control system according to claim 1, wherein the in-vehicle device controls a vehicle on which the in-vehicle device is mounted based on the vehicle allocation plan or outputs the vehicle allocation plan to the vehicle on which the in-vehicle device is mounted.

3. The vehicle control system according to claim 1, wherein the information relating to traveling on the route includes at least one of position information of the notification vehicle, time when the notification vehicle arrives at the first place, and time when the notification vehicle arrives at the second place.

4. The vehicle control system according to claim 1, wherein when the delay processing unit determines that the traveling of the notification vehicle that is a vehicle on which the in-vehicle device that notifies the computing device of the information relating to traveling on the route is mounted is earlier than the vehicle allocation plan, the occupation information is updated based on the notification of the notification vehicle and the route generation unit recreates the vehicle allocation plan.

5. The vehicle control system according to claim 1, wherein the section has a granularity equal to or finer than a vehicle traveling zone.

6. A computing device that is communicable with a plurality of in-vehicle devices each mounted on a corresponding one of vehicles and receiving a vehicle allocation plan including time and travel route information, the computing device comprising:

a storage unit that stores a vehicle allocation request, map information, and occupation information, wherein the vehicle allocation request includes constraints on a first place, a second place, and time, the map information includes information relating to connection of roads on which a vehicle travels, the occupation information includes a section and time of a road that is occupied and unavailable for traveling, and the computing device further comprising:

a route generation unit that calculates a route from the first place to the second place together with time information by using the occupation information and the map information and creates the vehicle allocation plan, the route satisfying constraints on the time and not passing through a road that is unavailable for traveling and included in the occupation information;

a trajectory generation unit that calculates a trajectory for a first vehicle on the route calculated by the route generation unit;

a comparison unit that calculates a section and time of a road occupied by the first vehicle and unavailable for another vehicle to travel based on the trajectory of the first vehicle generated by the trajectory generation unit;

an occupation management unit that adds the section and the time calculated by the comparison unit into the occupation information;

a server communication unit that transmits the vehicle allocation plan to the in-vehicle devices mounted on the vehicles, and wherein the plurality of in-vehicle devices further include a notification unit that notifies the computing device of information relating to traveling on the route, and the computing device further includes a delay processing unit that, when determining that traveling of a notification vehicle is delayed as compared with the vehicle allocation plan, updates the occupation information based on the delay of the notification vehicle and causes the route generation unit to recreate the vehicle allocation plan, the notification vehicle being a vehicle on which the in-vehicle device that notifies the computing device of the information relating to traveling on the route is mounted.

\* \* \* \* \*